(12) United States Patent
Han

(10) Patent No.: US 7,218,275 B2
(45) Date of Patent: May 15, 2007

(54) TEST APPARATUS AND CONTROL METHOD THEREOF FOR USE WITH LOCATION BASED SERVICE SYSTEM CAPABLE OF OPTIMIZING LOCATION BASED SERVICE BY ADJUSTING MAXIMUM ANTENNA RANGE

(75) Inventor: Gyuyoung Han, Ahn Yang (KR)

(73) Assignee: SK Telecom Co., Ltd., Seoul (KR)

(*) Notice: Subject to any disclaimer, the term of this patent is extended or adjusted under 35 U.S.C. 154(b) by 453 days.

(21) Appl. No.: 10/725,742

(22) Filed: Dec. 1, 2003

(65) Prior Publication Data
US 2004/0162086 A1 Aug. 19, 2004

(30) Foreign Application Priority Data
Feb. 19, 2003 (KR) .................. 10-2003-0010501
Jul. 31, 2003 (KR) .................. 10-2003-0053222

(51) Int. Cl.
*G01S 5/14* (2006.01)
(52) U.S. Cl. .................. 342/357.02; 342/357.1
(58) Field of Classification Search ............ 342/357.1, 342/357.02
See application file for complete search history.

(56) References Cited

U.S. PATENT DOCUMENTS

| 5,884,214 | A | 3/1999 | Krasner et al. ............ 701/207 |
| 6,289,279 | B1* | 9/2001 | Ito et al. .................... 701/213 |
| 6,522,888 | B1* | 2/2003 | Garceran et al. ......... 455/456.3 |
| 6,570,529 | B2* | 5/2003 | Richton et al. ......... 342/357.02 |
| 6,919,841 | B2* | 7/2005 | Yamazaki ............... 342/357.06 |
| 2002/0190896 | A1* | 12/2002 | Tsujimoto et al. ........ 342/357.1 |
| 2003/0132877 | A1* | 7/2003 | Forrester ................. 342/357.1 |

FOREIGN PATENT DOCUMENTS

| EP | 0806880 | 11/1997 |
| JP | 2002195846 | 7/2002 |
| JP | 2002196063 | 7/2002 |
| JP | 2002228738 | 8/2002 |
| KR | 2002-52438 | 7/2002 |
| WO | WO 0010028 | 2/2000 |

* cited by examiner

Primary Examiner—Gregory C. Issing
(74) Attorney, Agent, or Firm—Jones Day

(57) ABSTRACT

Disclosed are a method and a system for optimizing location-based services by adjusting the maximum antenna range of a wireless base station. The system for optimizing location-based services by adjusting a maximum antenna range (MAR) of a base station, the system comprising: a test apparatus for sending MAR optimizing data, including C-GPS geolocation information and A-GPS data which are received from at least one GPS satellite by using conventional-GPS (C-GPS) and assisted-GPS (A-GPS) schemes, to at least one measurement point; a base transceiver station for transmitting and receiving signals and data to and from the test apparatus and having a preset MAR; a base station controller for receiving and processing signals emitted from the base transceiver station and a mobile switching center connected to the base station controller; and a position determination entity for receiving the MAR optimizing data through a mobile communication network, analyzing the MAR optimizing data to update the MAR of a wireless base station that meets MAR optimizing requirements, and optimizing the location-based services.

25 Claims, 3 Drawing Sheets

TEST APPARATUS AND CONTROL METHOD THEREOF FOR USE WITH LOCATION BASED SERVICE SYSTEM CAPABLE OF OPTIMIZING LOCATION BASED SERVICE BY ADJUSTING MAXIMUM ANTENNA RANGE

FIELD OF THE INVENTION

The present invention relates to a test apparatus and method for optimizing a performance of a location-based service ("LBS") by adjusting a maximum antenna range ("MAR"); and more particularly to a test apparatus and method for optimizing the LBS, the apparatus having built-in A-GPS (Assisted Global Positioning System) receiver chip and C-GPS (Conventional-GPS) receiver, by detecting GPS signals transferred from GPS satellites, obtaining A-GPS data and C-GPS geolocation information used for adjusting the MAR, and transmitting the A-GPS data and the C-GPS geolocation information to a position determination entity through the mobile communication network.

BACKGROUND OF THE INVENTION

Many companies are struggling to develop new wireless Internet technologies which can be used to provide various communication services, such as wireless Internet services, regardless of places. Wireless Internet refers to an environment or technology which allows a moving user to access the Internet through a wireless network. With the development of mobile communication technologies and the explosive increase in the use of mobile phones, the wireless Internet services have also been greatly developed.

Among a variety of wireless Internet services provided to mobile terminals, such as cellular phones, PDAs or notebook computers, LBS is being popularized more and more due to its wide applications and availability. The LBS can be used in various applications and conditions, such as emergency assistance, criminal tracking, GIS (Geographic Information System), difference of mobile communication fees according to locations, traffic information, vehicle navigation, logistics control and location-based CRM (Customer Relationship Management).

In order to exploit the LBS, it is required to identify the location of a mobile communication terminal. A GPS is generally used to track the location of a mobile communication terminal.

The GPS is a worldwide navigation and positioning system which determines the location of an object on earth by using 24 GPS satellites orbiting the earth at an altitude of approximately 20,000 km. The GPS uses radio waves in a bandwidth of 1.5 GHz. Ground control stations which monitor the GPS satellites receive information transmitted from the satellites and synchronize transmission time. Users can monitor their locations by using GPS receivers. Generally, the GPS determines the location of an object by triangulation by using four satellites. Three satellites are used for accurate triangulation, and a fourth satellite is in orbit to correct a timing error.

However, it is difficult to determine the location of an object in downtown areas surrounded by high-rise buildings due to so-called multi-path effects and the lack of visible satellites. Also, an accurate location determination can hardly be made in a tunnel or in a basement of a building where satellites are not visible (where radio waves cannot reach). In addition, GPS receivers may require a TTFF (Time To First Fix) of several minutes to over ten minutes to initially determine their location, thereby causing inconvenience to the users of location-based wireless Internet services.

A-GPS answers some of the inherent problems with GPS. The A-GPS determines the location of a mobile communication terminal by combining GPS with wireless communication network resources. A mobile communication terminal collects geolocation information from both the GPS satellites and a wireless communication network to determine its location in 3-D in geodetic coordinates (latitude, longitude and altitude) with high accuracy. The wireless network and the mobile communication terminal transmit and receive data or messages by using parameters defined in IS (Interim Standard)-801-1.

In a CDMA (Code Division Multiple Access) communication network, one wireless base station (BS) covers an area corresponding to its maximum antenna range (MAR). The MAR is an area having a radius equal to the maximum distance that radio waves emitted from a base station antenna reach.

However, it is costly to install base stations based on MAR to cover every area in a country. Base stations installed in current mobile communication networks are set to have a uniform MAR of 3 Km to 5 Km. To provide high quality location-based services in the current mobile communication networks, base stations should be installed at every MAR coverage area.

To reduce the cost of installing base stations, the current mobile communication networks broaden the coverage of a voice or data call of a wireless base station by installing at least one optical repeater connected to the wireless base station by an optical cable. The optical repeater uses the same identification code as the wireless base station to which it is connected. Accordingly, the optical repeater can transfer the identification code of the connected base station to a position determination entity when a mobile communication terminal is located within an area covered by the optical repeater.

Therefore, if the terminal is in an area covered by the optical repeater, it is difficult to determine the location of a mobile communication terminal by using an A-GPS scheme. In the A-GPS scheme, a mobile communication terminal is not equipped with a GPS receiver. The mobile communication terminal obtains an identification code (address) of the wireless base station covering the area in which it is located, and transfers the identification code to the position determination entity through a mobile communication network. The position determination entity confirms the identification code received through the mobile communication network and detects an MAR set for the pertinent wireless base station.

Based on the detected MAR, the position determination entity extracts coordinate information of GPS satellites from which GPS signals can be received in the coverage area of the wireless base station. Subsequently, the position determination entity transfers the coordinate information as assistance data to the mobile communication terminal through the mobile communication network. Upon receiving the assistance data, the mobile communication terminal detects the GPS signals based on the coordinate information of the GPS satellites which is included in the assistance data.

The coordinate information of the GPS satellites, which is received by the mobile communication terminal under the A-GPS scheme, can effectively be used only when the mobile communication terminal is located within the area corresponding to the MAR set for the wireless base station. If the mobile communication terminal is located at the boundary of the base station or in an area covered by an optical repeater that uses the same identification code as the base station, the assistance data will be improper and useless. If the mobile communication terminal detects GPS signals by using improper GPS coordinate information, it will fail to accurately determine its location.

SUMMARY OF THE INVENTION

Accordingly, the present invention has been made to solve the above-mentioned problems occurring in the prior art, and an object of the present invention is to provide a test apparatus and method for optimizing the LBS, the apparatus having built-in A-GPS (Assisted Global Positioning System) receiver chip and C-GPS (Conventional-GPS) receiver, by detecting GPS signals transferred from GPS satellites, obtaining A-GPS data and C-GPS geolocation information used for adjusting the MAR, and transmitting the A-GPS data and the C-GPS geolocation information to a position determination entity through the mobile communication network.

In order to accomplish this object, there is provided a test apparatus for use in optimizing performance of a system for optimizing a location-based service (LBS) by adjusting a maximum antenna range (MAR), the test apparatus comprising: a key input part for inputting data to set the test apparatus to a conventional-GPS (C-GPS) operation mode or an assisted-GPS (A-GPS) operation mode; a GPS antenna for receiving a first GPS signal and a second GPS signal transmitted from at least one GPS satellite; a C-GPS receiver for extracting a first navigation data from the first GPS signal and generating a C-GPS geolocation information by using the first navigation data; a A-GPS receiver for extracting a second navigation data from the second GPS signal and generating an A-GPS data by using the second navigation data; and an embedded board having a CPU for setting the test apparatus to the C-GPS operation mode or the A-GPS operation mode according to a mode key received from the key input part, controlling the C-GPS receiver to generate the C-GPS geolocation information in the C-GPS operation mode and controlling the A-GPS receiver to generate the A-GPS data in the A-GPS operation mode.

In accordance with another aspect of the present invention, there is provided a test apparatus for use in optimizing performance of a system for optimizing a location-based service (LBS) by adjusting a maximum antenna range (MAR), the test apparatus comprising: a key input part for inputting data to set the test apparatus to a conventional-GPS (C-GPS) operation mode or an assisted-GPS (A-GPS) operation mode; a GPS antenna for receiving a first GPS signal and a second GPS signal transmitted from at least one GPS satellite; a C-GPS receiver for extracting a first navigation data from the first GPS signal and generating a C-GPS geolocation information by using the first navigation data; a A-GPS receiver for extracting a second navigation data from the second GPS signal and generating an A-GPS data by using the second navigation data; an embedded board having a CPU for setting the test apparatus to the C-GPS operation mode or the A-GPS operation mode according to a mode key received from the key input part, controlling the C-GPS receiver to generate the C-GPS geolocation information in the C-GPS operation mode and controlling the A-GPS receiver to generate the A-GPS data in the A-GPS operation mode; and a memory for storing the C-GPS geolocation information and the A-GPS data under the control of the CPU.

In accordance with another aspect of the present invention, there is provided a test apparatus for use in optimizing performance of a system for optimizing a location-based service (LBS) by adjusting a maximum antenna range (MAR), the test apparatus comprising: a key input part for inputting data to set the test apparatus to a conventional-GPS (C-GPS) operation mode or an assisted-GPS (A-GPS) operation mode; a GPS antenna for receiving a first GPS signal and a second GPS signal transmitted from at least one GPS satellite; a C-GPS receiver for extracting a first navigation data from the first GPS signal and generating a C-GPS geolocation information by using the first navigation data; a A-GPS receiver for extracting a second navigation data from the second GPS signal and generating an A-GPS data by using the second navigation data; an embedded board having a CPU for setting the test apparatus to the C-GPS operation mode or the A-GPS operation mode according to a mode key received from the key input part, controlling the C-GPS receiver to generate the C-GPS geolocation information in the C-GPS operation mode and controlling the A-GPS receiver to generate the A-GPS data in the A-GPS operation mode; a memory for storing the C-GPS geolocation information and the A-GPS data under the control of the CPU; a wireless modem for modulating the C-GPS geolocation information and the A-GPS data, generating and transmitting a MAR optimizing data signal; and a RF(Radio Frequency) antenna for receiving the MAR optimizing data signal and radiating the MAR optimizing data signal to radio space.

In accordance with another aspect of the present invention, there is provided a method for controlling a test apparatus with a view to optimizing a location-based service (LBS) by adjusting a maximum antenna range (MAR), the method comprising the steps of: (a) setting the test apparatus to an assisted-GPS (A-GPS) operation mode at each measurement point and transmitting a identification code of a wireless base station which covers or is adjacent to the measurement point; (b) searching and receiving a GPS signal by receiving and analyzing an assistance data through mobile communication networks; (c) generating and storing an A-GPS data, and switching the test apparatus into a conventional-GPS (C-GPS) operation mode; (d) searching and receiving a GPS signal; (e) generating a C-GPS geolocation information and gathering and transmitting the C-GPS geolocation information and the A-GPS data to a position determination entity through the mobile communication networks.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
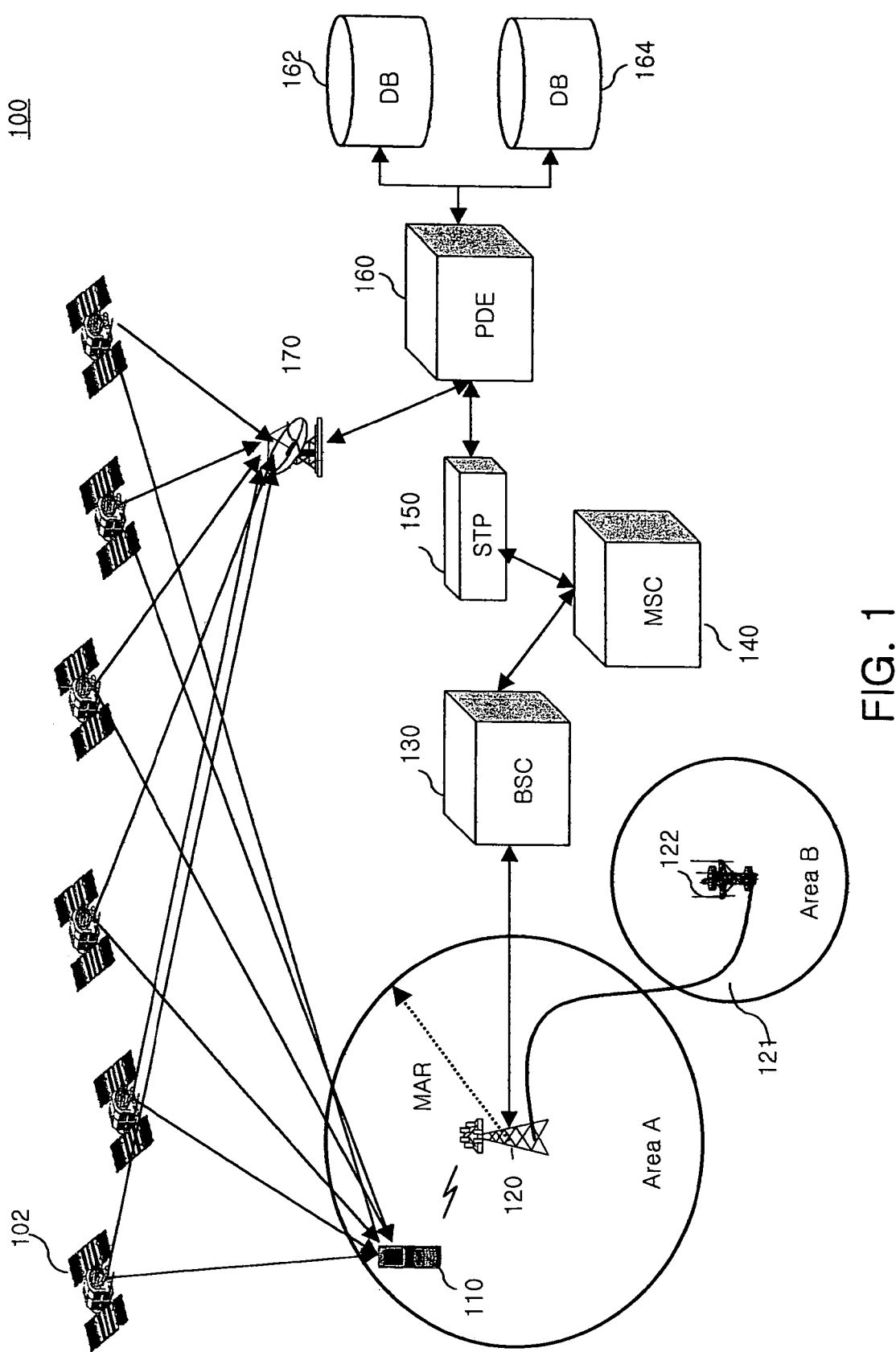
FIG. 1 is a block diagram of a system for optimizing LBS by adjusting the MAR of a wireless base station in accordance with a preferred embodiment of the present invention.

Hereinafter, a preferred embodiment of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention rather unclear.

FIG. 1 is a block diagram of a system for optimizing LBS by adjusting the MAR of a wireless base station in accordance with a preferred embodiment of the present invention.

The LBS optimizing system 100 comprises a plurality of GPS satellites 102, a test apparatus 110, a base transceiver station (BTS) 120, an optical repeater 122, a base station controller (BSC) 130, a mobile switching center (MSC) 140, a signal transfer point (STP) 150, a position determination entity (PDE) 160, an MAR database 162, an MAR optimization database 164 and a reference GPS antenna 170.

The test apparatus 110 is provided with a GPS antenna or a GPS receiver for receiving GPS signals from the plurality of GPS satellites 102, extracting navigation data included in the GPS signals and transferring the extracted navigation data to the position determination entity 160 through the mobile communication network. As a terminal for optimizing the MAR in a mobile communication system, the test apparatus 110 collects data required for the MAR optimization while moving by using a moving means such as a vehicle, and transfers the collected data to the position determination entity 160.

The test apparatus 110 is a mobile communication terminal which can determine its location by using A-GPS or C-GPS (Conventional GPS) schemes. In other words, the test apparatus 110 includes both an A-GPS receiver and a C-GPS receiver to exploit the two GPS schemes.

C-GPS is capable of providing relatively accurate position determination, without being assisted by a communication network. C-GPS can normally determine the position of an object in an open-sky environment. In the C-GPS system, however, a terminal consumes lots of power and requires a TTFF of up to ten minutes. Also, a separate C-GPS receiver is required.

A-GPS is a location tracking technology which combines C-GPS by using GPS satellites with a network-assisted technology by using a CDMA communication network. Compared to C-GPS, A-GPS assisted by a communication network can pinpoint a person's or object's position even indoors or in a place where GPS signals can hardly be received. A-GPS technology offers superior positioning accuracy and shortens the TTFF to several seconds or less. Moreover, it is energy-efficient because a terminal consumes less power. Also, it reduces manufacture cost of the terminal because an A-GPS receiver is combined with a modem chip to form an integral structure.

The test apparatus 110 periodically obtains A-GPS data (such as satellite identification codes, number of satellites, measurement time, strength of satellite signals, pseudorange, network ID and base station ID) by using A-GPS scheme and C-GPS geolocation information (such as latitudes, longitudes and number of satellites) by using C-GPS scheme. The test apparatus 110 transfers the obtained A-GPS data and C-GPS geolocation information to the position determination entity 160 through the mobile communication network.

It will be explained in more detail how the test apparatus 110 obtains the A-GPS data and the C-GPS geolocation information in accordance with the present invention. When the test apparatus 110 is set up C-GPS operation mode, the test apparatus 110 detects GPS signals at every predetermined position by using a C-GPS receiver, calculates the C-GPS geolocation information by using the detected GPS signals and temporarily stores the calculation results, e.g., C-GPS geolocation information, in its internal memory.

Also, in order to obtain positional data by using A-GPS scheme, the test apparatus 110 transfers rough position information (identification code of a wireless base station) to the position determination entity 160 through the mobile communication network. The position determination entity 160 searches for suitable assistance data by using the rough position information received from the test apparatus 110, and transfers the detected assistance data to the test apparatus 110 through the mobile communication network. The assistance data refers to coordinate information of at least one GPS satellite, which has been extracted by using the identification code of the wireless base station transferred from the test apparatus 110. Additionally, the coordinate information of at least one GPS satellite refers to information about coordinates of one or more GPS satellites which are determined to be visible at a position where the test apparatus 110 is located.

Based on the assistance data received from the position determination entity 160, the test apparatus 110 detects and receives GPS radio signals emitted from the visible GPS satellites 102. The test apparatus 110 detects the GPS signals by using an A-GPS receiver at every position where the C-GPS geolocation information has been obtained by using C-GPS scheme, and temporarily stores the detection results, e.g., A-GPS data, in its internal memory. The test apparatus 110 transfers the C-GPS geolocation information obtained by using C-GPS scheme and the A-GPS data obtained by using A-GPS scheme (hereinafter referred to as "MAR optimizing data") to the position determination entity 160 by using a built-in wireless modem in real time.

The base transceiver station 120 receives a signal requesting call access from the test apparatus 110 through a traffic channel among signal channels, and transfers the signal to the base station controller 130. The base station controller 130 controls the base transceiver station 120, and performs assignment of a wireless channel to the test apparatus 110 and cancellation thereof, control of transmission outputs of the test apparatus 110 and the base transceiver station 120, determination of soft handoff or hard handoff between cells, transcoding, vocoding, and operation and maintenance of the wireless base stations.

The base transceiver station 120 and the base station controller 130 have structures supporting both synchronous mobile communication systems and asynchronous mobile communication systems. The base transceiver station (BTS) 120 and the base station controller (BSC) 130 in a synchronous mobile communication system can be a radio transceiver subsystem (RTS) and a radio network controller (RNC) in an asynchronous mobile communication system. The base transceiver station 120 and the base station controller 130 in accordance with the present invention are not limited to those mentioned above, but may include a GSM network and a future 4G access network.

Radio waves emitted from the antenna of the base transceiver station 120 can be received by the test apparatus 110 located within area A having a radius equal to the MAR. The signals are used to process calls of the test apparatus 110 in area A. The MAR set for each base transceiver station 120 is stored in the position determination entity 160. Generally, the MAR is set uniformly to a range from 3 Km to 5 Km in both urban and rural areas.

The optical repeater 122 is connected to the base transceiver station 120 by using an optical cable 121 in order to offer mobile communication services to area B. The optical repeater 122 has the same PN (Pseudo Noise) code as the wireless base station which includes the base transceiver station 120. Accordingly, the CDMA communication network recognizes the optical repeater 122 as being identical to the wireless base station to which the optical repeater 122 is connected by the optical cable 121.

The optical repeater 122 reduces the cost of installing an additional base transceiver station (over 5 hundred million Won per base station) and broadens the coverage of the base transceiver station 120 to include its coverage. Therefore, generally one wireless base station is connected with plurality of optical repeaters in present mobile communication networks.

The mobile switching center (MSC) 140 controls the wireless base stations to more effectively operate and communicate with an electronic switching system installed in a public telephone network. The mobile switching center 140 receives data or messages from the test apparatus 110 through the base station controller 130 and transfers the received data or messages to the position determination entity 160 via the signal transfer point (STP) 150. The mobile switching center 140 performs basic and supplementary service processing, subscriber's incoming and outgoing call processing, position record and handoff processing, and communicating with other networks. The mobile switching center 140 can support IS (Interim Standard)-95 A/B/C systems, as well as 3G and 4G mobile communication networks.

The signal transfer point (STP) 150 is a signal relay station for relaying and exchanging signal messages in a common channel signaling system of ITU-T. A signal network formed by using the STP 150 operates in an non-associated mode which does not associate a speech path with a signal path. Various signals are transferred via the STP having a speech path, other than the switching center, thereby improving reliability and cost-effectiveness. Also, the STP 150 converts a signal message. When it is not possible to relay a signal message, the STP 150 notifies the signal message to another switching center.

The position determination entity 160 receives and analyzes the MAR optimizing data transmitted from the test apparatus 110 to know a wireless base station for which MAR optimization is needed. The position determination entity 160 performs MAR optimization based on the analysis results. As a result of optimization, the MAR of the object wireless base station is updated to a new value which is then stored in the MAR database 162. The MAR optimization performed by the position determination entity 160 will be explained in more detail with reference to FIG. 2.

The position determination entity 160 performs a series of functions required to determine the location of an object. The position determination entity 160 calculates the longitude and latitude coordinates of the test apparatus 110 by using the A-GPS data transferred from the test apparatus 110 through the mobile communication network. More specifically, when receiving rough position information (such as identification code of a wireless base station) from the test apparatus 110, the position determination entity 160 searches the MAR database 162 to detect and read the MAR set for the pertinent wireless base station.

Upon detecting the geolocation information and MAR of the pertinent wireless base station, the position determination entity 160 sends a message "Provide GPS Acquisition Assistance" as defined in the IS-801-1 Standards, including information (coordinate information, identification code, etc.) of every GPS satellite 102 from which GPS signals can be received in that wireless base station, to the test apparatus 110 through the mobile communication terminal. In other words, the position determination entity 160 receives the orbit information of the GPS satellites 102 from the reference GPS antenna 170 which monitors all GPS satellites 102 in real time.

Subsequently, the position determination entity 160 extracts information about the GPS satellites 102 from which GPS signals can be well received by the test apparatus 110, by using the longitude and latitude coordinates and MAR of the wireless base station of the area in which the test apparatus 110 is located. The position determination entity 160 transfers the extracted information about the GPS satellites 102 to the test apparatus 110, together with the message "Provide GPS Acquisition Assistance."

When receiving the message "Provide GPS Acquisition Assistance," the test apparatus 110 extracts the information about the GPS satellites 102 included in that message. Also, the test apparatus 110 detects and receives GPS signals emitted from one or more GPS satellites 102.

Based on the received GPS signals, the test apparatus 110 determines the identification codes and number of GPS satellites from which GPS signals have been received, the strength of the GPS signals and the pseudorange. The test apparatus 110 transfers A-GPS data and a message "Provide Pseudorange Measurement" as defined in the IS-801-1 Standards to the position determination entity 160 through the mobile communication network. Upon receiving the message "Provide Pseudorange Measurement" from the test apparatus 110, the position determination entity 160 extracts data included in that message and calculates the longitude and latitude coordinates of the test apparatus 110.

The MAR database 162 stores a table of MARs which are set according to the identification codes of the plurality of wireless base stations. When receiving a signal requesting A-GPS position determination, including the identification code of a wireless base station, from the test apparatus 110, the position determination entity 160 detects the table of MARs stored in the MAR database 162 and transfers assistance data, including information about the GPS satellites which are visible in the area of the pertinent wireless base station, to the test apparatus 110.

The MAR database 162 receives a new MAR of the wireless base station for which MAR optimization has been performed by the position determination entity 160, and updates the table of MARs accordingly. Also, the MAR database 162 stores the updated table of MAR values.

The MAR optimization database 164 stores the MAR optimizing data received by the position determination entity 160 from the test apparatus 110. The MAR optimization database 164 classifies the MAR optimizing data according to the measurement dates, times and equipment, as well as the wireless base stations. Accordingly, the position determination entity 160 can search the MAR optimization database 164 and perform a required MAR optimization.

The principle of adjusting the MAR for optimizing LBS in accordance with the present invention will now be explained.

Provided the test apparatus 110 is located in area A covered by the base transceiver station 120, the test apparatus 110 can determine its location with high precision by receiving the GPS signal from a multiple of GPS satellites 102 since information of the GPS satellite 102 transferred from the position determination entity 160 is accurate. However, if the test apparatus 110 is out of area A and located in area B covered by the optical repeater 122, it cannot be guaranteed that the test apparatus 110 accurately determine its location by A-GPS scheme.

If a position determination request signal is generated by the test apparatus 110 which is located in area B, the base transceiver station 120 which is currently located in area A and connected to the optical repeater 122 via the optical cable 121 transfers its PN code to the position determination entity 160 through the mobile communication networks. Then, the position determination entity 160 transfers the information of the GPS satellite 102 which receives the GPS signal by using the MAR set and the position coordinates of the base transceiver station 120. The information of the GPS satellite 102 can be effectively used only in area A, because the information of the GPS satellite 102 is extracted by using the MAR set of the base transceiver station 120.

However, if the test apparatus 110 tries to receive the GPS signal by using the information of the GPS satellite 102 which is effective in area A, it cannot receive a sufficient number of GPS signals (four or more), because the test apparatus 110 is located in area B. Therefore, the position determination entity 160 cannot receive the sufficient GPS signals from the test apparatus 110 and cannot accurately determine its location.

To cope with this problem, the test apparatus 110 receives the A-GPS data and the C-GPS geolocation information while moving at least one area having a base transceiver station 120 and/or an optical repeater by using a vehicle, and transfers the received data to the position determination entity 160 through the mobile communication networks. The position determination entity 160 receives both the A-GPS data and the C-GPS geolocation information from the test apparatus 110 and analyzes the received A-GPS data and the received C-GPS geolocation information.

If the analysis by the position determination entity 160 turns out that it has received four or more GPS signals in the C-GPS operation mode but it has received about two or less GPS signals in the A-GPS operation mode, it determines that its assistance data is not effective. In other words, the position determination entity 160 determines that MAR optimization is needed for the measurement point where the test apparatus 110 which transfers the A-GPS data and the C-GPS geolocation information is located.

The position determination entity 160 or the MAR optimization database 164 calculates distance between longitude and latitude coordinates of A-GPS receiver serving base station and longitude and latitude coordinates of the measurement point which are obtained in the C-GPS position information by using the GPS satellite identification codes, the number of the GPS satellites, longitude and latitude coordinates of the measurement point which have been obtained in the C-GPS geolocation information, and NID (Network ID) and BSID(Base Station ID) which have been obtained in the A-GPS data. In turn, the position determination entity 160 or the MAR optimization database 164 optimizes the MAR set by updating the MAR set to a calculated maximum distance.

Figure 2:
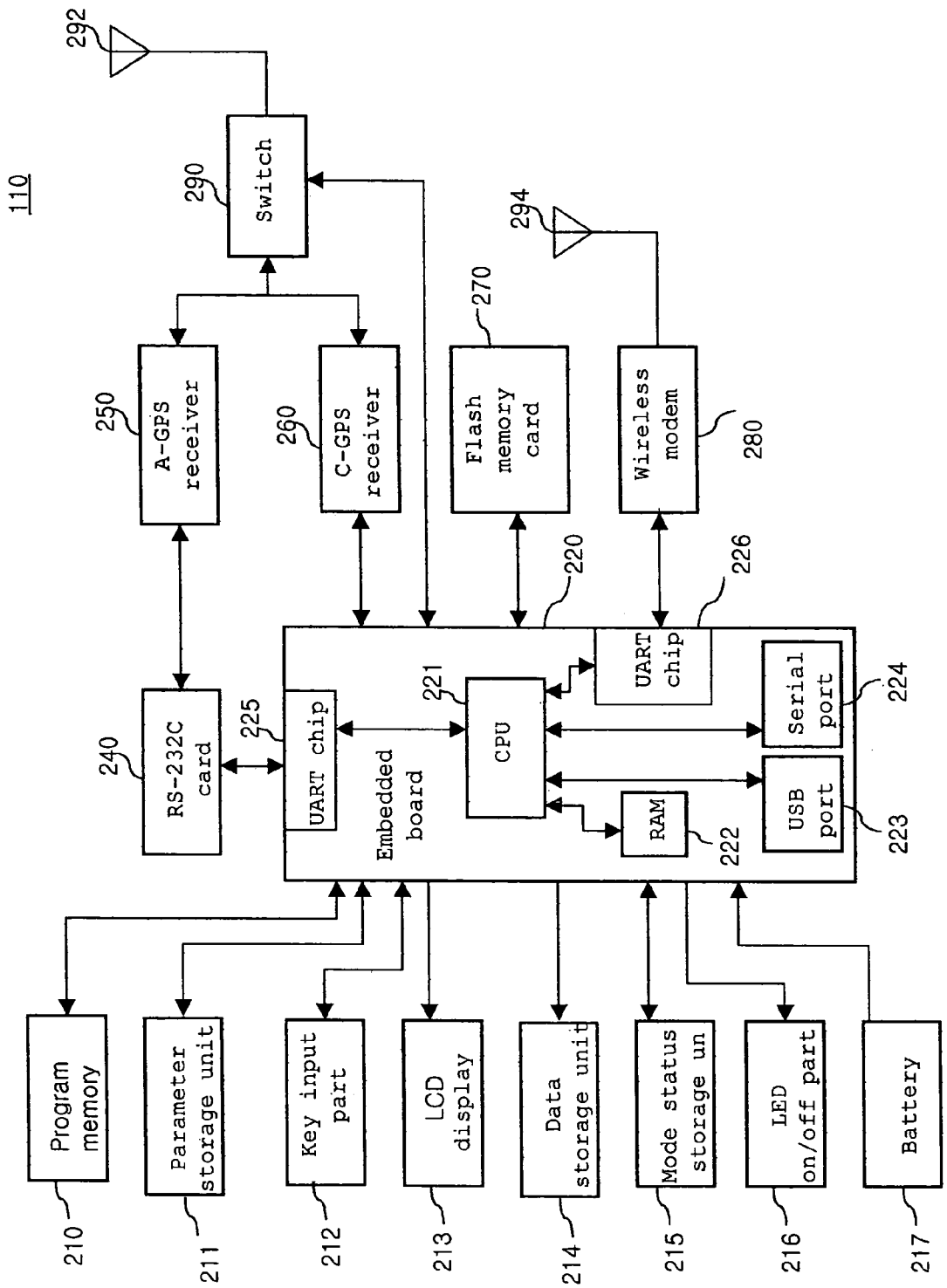
FIG. 2 is a block diagram of an internal structure of a test apparatus in accordance with the preferred embodiment of the present invention.

FIG. 2 is a block diagram of an internal structure of a test apparatus 110 in accordance with the preferred embodiment of the present invention.

The test apparatus 110 comprises a program memory 210, a parameter storage unit 211, a key input part 212, a LCD display 213, a data storage unit 214, a mode status storage unit 215, a LED on/off part 216, a battery 217, an embedded board 220, and a RS-232C card 240. In addition, the test apparatus 110 comprises an A-GPS receiver 250, a C-GPS receiver 260, a flash memory card 270, a wireless modem 280, a switch 290, a GPS antenna 292 and a RF antenna 294.

The program memory 210 stores therein a protocol software for processing messages transferred to and received from the mobile communication networks as well as a GPS measurement program in accordance with the preferred embodiment of the present invention. The GPS measurement program provides various functions such as setting or changing operation modes of test apparatus 110, storing the number of GPS data measurement, measurement time, coordinates of measurement point and measurement result as log files and displaying operation menus for setting or changing the operation modes and measurement result. The operation modes of the test apparatus 110 refer to the C-GPS operation mode and the A-GPS operation mode for obtaining the GPS data. The GPS measurement program can be coded by object oriented languages, such as C++program language and JAVA program language.

The parameter storage unit 211 stores various kinds of parameters which will be used in synchronous, asynchronous or the 4 G communication systems defined in 3GPP (The $3^{rd}$ Generation Partnership), 3GPP2, ITU or OHG (Operator Harmonization Group). The protocol software stored in the program memory 110 encodes and decodes sound and/or data by using the parameters stored in the parameter storage unit 211.

The key input part 212 has a plurality of key buttons for use in inputting numbers and characters, e.g., telephone number etc. The key buttons generally include 12 number keys, e.g., 0~9, * and #, a plurality of functional keys, a plurality of cursor move keys and scroll keys etc. The key input part 212 also includes a plurality of mode setting key buttons for setting the operation modes of the test apparatus 110. Therefore, an operator sets the test apparatus 110 to an A-GPS operation mode or a C-GPS operation mode by using the GPS measurement program installed in the program memory 210 or by operating the mode setting key buttons included in the key input part 212.

The LCD display 213 generally displays various indicators of the test apparatus 110, e.g., battery discharge level, received signal intensity and date and time. The LCD display 213 further provides a screen for monitoring the execution of GPS measurement program or the C-GPS geolocation information and the A-GPS data which are received and calculated by the test apparatus 110.

The mode status storage unit 215 stores current operation modes of the test apparatus 110 upon assigning a status flag, e.g., 0, 1 and 2 to each operation mode, the operation modes being selected through the key input part 212. In other words, a CPU(Central Process Unit) 221 installed in the embedded board 220 assigns a unique status flag to identify each operation mode of the test apparatus 110, e.g., a waiting mode, the C-GPS operation mode, the A-GPS operation mode and a data transfer mode, and updates the mode status storage unit 215.

The LED(Light Emitting Diode) on/off part 216 indicates whether the test apparatus 110 is under operation or not, there is an error or not, a GPS data is received or not and a MAR optimizing data is transmitted or not. Also, the battery 217 provides power for driving the test apparatus 110 and is rechargeable and portable.

The embedded board 220 generally includes a CPU 221, a RAM 222, a LAN port, a USB(Universal Serial Bus) port 223 and a serial port 224, etc. The fact that pluralities of electronic parts are integrated into the embedded board 220 provides various advantages, e.g., preventing a data buffering and electromagnetic interference between adjacent cable and electric conduction line which are caused by integrating a number of electronic parts by using cable or electric conduction line.

The CPU 221 installed in embedded board 220 receives the A-GPS data through the RS-232C card 240 and temporarily stores the received A-GPS data in the RAM 222 also installed in the embedded board 220. The CPU 221 controls the RAM 222 to temporarily store the C-GPS geolocation information received from the C-GPS receiver 260 and to send the C-GPS geolocation information together with the A-GPS data.

The RAM 222 installed in the embedded board 220 temporarily stores or deletes the A-GPS data and the C-GPS geolocation information. Also, the RAM 222 functions as a data buffer when a program installed in the test apparatus 110 is executed, and temporarily stores input data from the key input part 212.

The USB port 223 and the serial port 224 are communication interface ports. The test apparatus 110 can communicate with a communication device such as a computer through the USB port 223 or the serial port 224. Therefore, if the MAR optimizing data measured by the test apparatus 110 fails to be transmitted or abnormally transmitted to the position determination entity 160 due to poor communication environment, the MAR optimizing data stored in the test apparatus 110 can be copied or moved to the communication device such as the computer through the USB port 223 or the serial port 224. In turn, the MAR optimizing data copied or moved to computer can be transferred to the position determination entity 160 through wired communication networks.

A UART(Universal Asynchronous Receiver/Transmitter) chip 225, 226 converts a parallel bit stream into a serial bit stream or vice versa. More specifically, data of electronic parts embedded in the test apparatus 110 is received and transmitted as the parallel bit stream structure. The parallel bit stream structure is useful for receiving and transmitting data through short distance, but is not effective for receiving and transmitting data through long distance. Therefore, the UART chip 225, 226 converts the parallel bit stream generated by the test apparatus 110 to the serial bit stream suited for receiving and transmitting data through long distance and transfers to communication device such as a modem. Also, the UART chip 225, 226 converts the serial bit stream received through the communication networks to the parallel bit stream for use in the test apparatus 110.

Therefore, the UART chip 225 converts the MAR optimizing data of the serial bit stream received by the RS-232C card 240 into the MAR optimizing data of the parallel bit stream prior to transferring to the CPU 221. On the other hand, the UART chip 226 converts the MAR optimizing data of the parallel bit stream processed by the CPU 221 into the MAR optimizing data of the serial bit stream prior to transferring to the wireless modem 280.

The RS-232C(Recommended Standard-232 Revision C) card 240 supports the RS-232C standard interface used to receive/transmit data from/to the communication device such as a computer and a modem. The RS-232C card 240 is a data interface device between the UART chip 225 and the A-GPS receiver 250.

The A-GPS receiver 250 extracts navigation data from the GPS signal received by the test apparatus 110 to determine a location under the A-GPS scheme. The A-GPS receiver 250 also calculates GPS satellite identification codes, number of GPS satellites, strength of satellite signals and pseudorange etc., by using the extracted navigation data and finally transfers to the CPU 221 through the RS-232C card 240 and the UART chip 225.

The C-GPS receiver 260 extracts navigation data from the GPS signal received by the test apparatus 110 to determine a location under the C-GPS scheme similarly to the A-GPS receiver 250. However, the C-GPS receiver 260 directly calculates longitude and latitude coordinates of the test apparatus 110 as well as GPS satellite identification codes and number of GPS satellites by using the extracted navigation data and determines position of the test apparatus 110. For directly calculating the longitude and latitude coordinates of the test apparatus 110, the C-GPS receiver 260 has a coordinate calculation algorithm which calculates the longitude and latitude coordinates by using the navigation data.

The flash memory card 270 is a kind of an EEPROM. Unlike a typical EEPROM, the flash memory card 270 can be reprogrammed by each block and functions as both RAM and ROM. In addition, since the flash memory card 270 does not consume power for maintaining recorded data, the flash memory card 270 is widely used in low-power device such as a cellular phone and a PDA etc. If the test apparatus 110 fails to perform real-time transmission of the MAR optimizing data which is measured at each measurement point and temporarily stored in the RAM 222, the flash memory card 270 receives the MAR optimizing data from the RAM 222 and stores it. In other words, the flash memory card 270 functions as a hard-disk of a computer for the test apparatus 110 to assist the RAM 222.

The flash memory card 270 may be a PCMCIA(Personal Computer Memory Card International Association) card, a compact flash card, a smart media card, a multimedia card and a secure digital card etc.

The wireless modem 280 receives the MAR optimizing data stored in the RAM 222 or in the flash memory card 270 via the. UART chip 226. The wireless modem 280 modulates the received MAR optimizing data, generates the MAR optimizing data signal and transfers it through the RF antenna 294.

The switch 290 switches on and off to have the GPS antenna 292 to be connected alternately to the A-GPS receiver 250 and the C-GPS receiver 260 under the control of the CPU 221. In other words, when an A-GPS operation mode key is inputted by the key input part 212, the CPU 221 makes the switch 290 connect to the A-GPS receiver 250. On the other hand, when a C-GPS operation mode key is inputted by the key input part 212, the CPU 221 makes the switch 290 connect to the C-GPS receiver 260.

The GPS antenna 292 detects and receives the GPS signal under the control of the CPU 221 in the C-GPS operation mode or the A-GPS operation mode.

The RF antenna 294 receives the modulated MAR optimizing data from the wireless modem 280 and radiates it to radio space.

Figure 3:
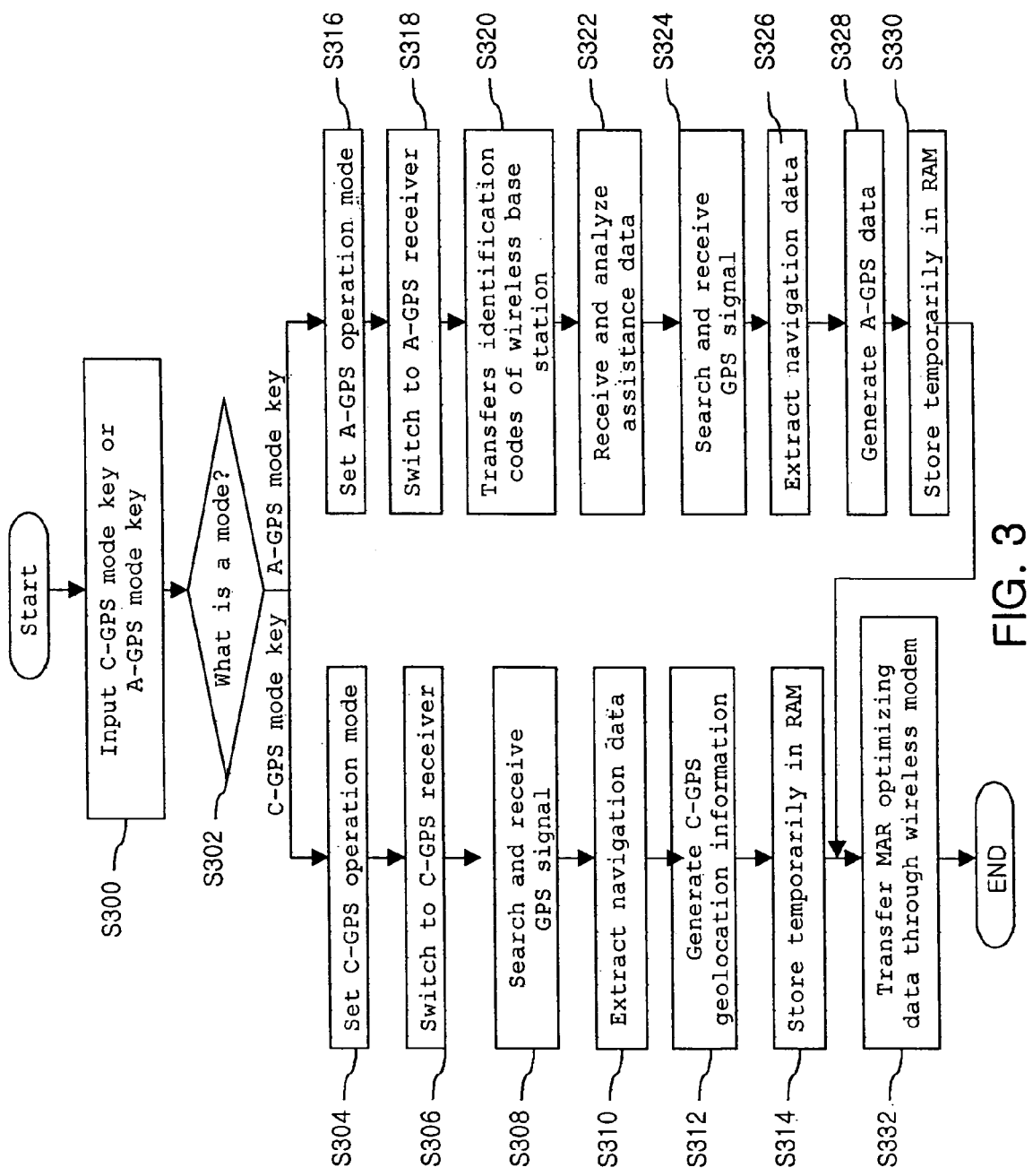
FIG. 3 is a flow diagram showing a process of operating the test apparatus in accordance with the preferred embodiment of the present invention.

FIG. 3 is a flow diagram showing an operating process of the test apparatus 110 in accordance with the present invention.

The flow diagram will be described in detail by reference to FIG. 2. An operator, who wishes to obtain the MAR optimizing data by using the test apparatus 110, inputs the C-CPS mode key or the A-GPS mode key by operating at least one mode setting key button formed on the key input part 212 (S300). As explained in conjunction with FIG. 1, the operating mode can be switched by the GPS measurement program installed in the program memory 210.

The CPU 221 detects input of a key inputted at step 300 and finds out which mode key is inputted (S302). If the C-GPS mode key is found to be inputted, the CPU 221 sets the test apparatus 110 to the C-GPS operation mode (S304). Also, the CPU 221 generates a switching signal to set the switch 290 to the C-GPS receiver 260 (S306). The test apparatus 110 changed to the C-GPS operation mode searches and receives the GPS signal by using the GPS antenna 292 (S308).

The C-GPS receiver 260 of the test apparatus 110 analyzes the GPS signal received at step 308, extracts the navigation data (S310) and generates the C-GPS geolocation information by using the extracted navigation data (S312). The CPU 221 temporarily stores the C-GPS geolocation information generated by C-GPS receiver 260 at step 312 in the RAM 222 (S314).

Meanwhile, if the A-GPS mode key is inputted, the CPU 221 controls the test apparatus 110 to switch to the A-GPS operation mode (S316). Also, the CPU 221 generates a switching signal and controls the switch 290 set to the A-GPS receiver 250 (S318).

The test apparatus 110 changed to the A-GPS operation mode transfers identification codes of wireless base station to the position determination entity 160 through A-GPS mobile communication networks (S320). The position determination entity 160 receives the identification codes of wireless base station, generates the assistance data and transfers it to the test apparatus 110 through mobile communication networks, and the test apparatus 110 receives and analyzes the assistance data (S322).

The test apparatus 110 searches and receives the GPS signal by using the assistance data analyzed at step S322 (S324). The GPS antenna 292 used in the A-GPS operation mode is the same GPS antenna used in C-GPS operation mode. In other words, the test apparatus 110 receives the GPS signal at the fixed measurement point by using the same GPS antenna 292, therefore, a receiving position error of the GPS signal between C-GPS operation mode and A-GPS operation mode does not occur.

The test apparatus 110 analyzes the received GPS signal, extracts the navigation data (S326) and generates the A-GPS data by using the extracted navigation data (S328). The CPU 221 temporarily stores the A-GPS data generated by A-GPS receiver 250 at step 328 in the RAM 222 (S330).

When the CPU 221 completes receipt of the C-GPS geolocation information and the A-GPS data, the CPU 221 gathers the C-GPS geolocation information and the A-GPS data temporarily stored in the RAM 222, processes the C-GPS geolocation information and the A-GPS data as the MAR optimizing data and transfers them to the position determination entity 160 through the wireless modem 280 and the RF antenna 294 (S332).

If the test apparatus 110 fail to transmit the MAR optimizing data at step S332 due to a trouble itself or an error from communication environment etc., the flash memory card 270 fetches and stores the MAR optimizing data stored in the RAM 222. Therefore, when the test apparatus 110 is repaired or the communication environment turns better, the test apparatus 110 resumes transferring the MAR optimizing data to the position determination entity 160.

In accordance with the present invention, the test apparatus 110 measures alternately under the C-GPS scheme and A-GPS scheme. Therefore, there may be a disadvantage that the test apparatus 110 cannot synchronize receiving time of the GPS signal under the C-GPS scheme and the A-GPS scheme, respectively. To synchronize receiving time of the GPS signal, therefore, the test apparatus 110 obtains the A-GPS data by determining the measurement point periodically(e.g., per one minute) under the A-GPS operation mode.

In the mean time, the test apparatus 110 obtains the C-GPS geolocation information by determining the measurement point at GPS time of integer unit. The test apparatus 110 then corrects the position coordinates of the measurement point at which the C-GPS geolocation information is obtained, according to the receiving time of the GPS signal under the A-GPS operation mode. Then, the test apparatus 110 is capable of synchronizing the determination time of the measurement point under the A-GPS operation mode and the C-GPS operation mode.

As described above, in a conventional mobile communication network, a mobile communication terminal often fails to determine its location when using the A-GPS scheme since a uniform and non-variable MAR is set for each wireless base station. The inventive test apparatus, however, can find the area in which the accurate identification of a location is hard to achieve, so the location based service becomes optimized.

Although a preferred embodiment of the present invention has been described for illustrative purposes, those skilled in the art will appreciate that various modifications, additions and substitutions are possible, without departing the scope and spirit of the invention as disclosed in the accompanying claims.

What is claimed is:

1. A test apparatus for use in optimizing a location-based service (LBS) by updating a maximum antenna range (MAR) set for a base station in location-based service system including a position determination entity, the test apparatus comprising:
a key input part for inputting data to set the test apparatus to a conventional-GPS (C-GPS) operation mode or an assisted-GPS (A-GPS) operation mode;
a GPS antenna for receiving GPS signals transmitted from at least one GPS satellite;
an RF (Radio Frequency) antenna for receiving an RF signal;
a C-GPS receiver for receiving a first set of GPS signals through the GPS antenna, extracting first navigation data from the first set of GPS signals and generating a C-GPS geolocation information by using the first navigation data, wherein the C-GPS geolocation information includes the latitude and the longitude of measurement location and number of GPS satellites transmitting the first set of GPS signals;
an A-GPS receiver for receiving a second set of GPS signals by using an assistance data received from the position determination entity, extracting second navigation data from the second set of GPS signals and generating an A-GPS data by using the second navigation data and the RF signal, wherein the A-GPS data includes number of the GPS satellites transmitting the second set of GPS signals and network ID and base station ID of the RF signal;
an embedded board having a CPU for setting the test apparatus to the C-GPS operation mode or the A-GPS operation mode according to a mode key received from the key input part, controlling the C-GPS receiver to generate the C-GPS geolocation information in the C-GPS operation mode and controlling the A-GPS receiver to generate the A-GPS data in the A-GPS operation mode; and a wireless modem for modulating the C-GPS geolocation information and the A-GPS data, generating and transmitting a MAR optimizing data signal for use in optimizing the MAR, wherein the MAR optimizing data signal comprises the C-GPS geolocation information obtained in the C-GPS operation mode and the A-GPS data obtained in the A-GPS operation mode.

2. The test apparatus according to claim 1, wherein the test apparatus further comprises a switch for rendering the GPS antenna to be connected alternately to the C-GPS receiver and the A-GPS receiver under the control of the CPU.

3. The test apparatus according to claim 1, wherein the test apparatus further comprises an RS-232C (Recommended Standard-232 Revision C) card which functions as a data interface between the A-GPS receiver and the embedded board.

4. The test apparatus according to claim 1, wherein the key input part includes at least one mode setting key button for setting or switching operation modes of the test apparatus to the C-GPS operation mode or the A-GPS operation mode.

5. The test apparatus according to claim 1, wherein the test apparatus further comprises a program memory for storing a GPS measurement program for setting or switching operation modes of the test apparatus to the C-GPS operation mode or the A-GPS operation mode.

6. The test apparatus according to claim 5, wherein the GPS measurement program provides a log file generation function for storing the number of GPS data measurements, measurement time, coordinates of measurement points and measurement results as log files and a user interface function for displaying operation menu for setting or changing the operation mode and the measurement results.

7. The test apparatus according to claim 1, wherein the test apparatus further comprises a mode status storage unit for managing operation modes by assigning a unique flag to a waiting mode, the C-GPS operation mode and the A-GPS operation mode.

8. The test apparatus according to claim 1, wherein the test apparatus further comprises a LED(Light Emitting Diode) on/off part for indicating whether the test apparatus is in operation or not, there is an error or not and the first signal or the second signal is received or not.

9. The test apparatus according to claim 1, wherein the test apparatus further comprises a battery for providing electric power for driving the test apparatus.

10. The test apparatus according to claim 1, wherein the embedded board includes:

a UART(Universal Asynchronous Receiver/Transmitter) chip for receiving/transmitting data from/to an internal communication device of the test apparatus;

a RAM for temporarily storing the C-GPS geolocation information and the A-GPS data; and a communication interface for receiving/transmitting data from/to a communication device through a USB port or a serial port.

11. The test apparatus according to claim 1, wherein the AGPS data includes identification codes of at least one GPS satellite transmitting the second set of GPS signals, measurement time and strength of the second set of GPS signals and pseudorange.

12. A test apparatus for use in optimizing a location-based service (LBS) by updating a maximum antenna range (MAR) set for a base station in location-based service system including a position determination entity, the test apparatus comprising:

a key input part for inputting data to set the test apparatus to a conventional-GPS (C-GPS) operation mode or an assisted-GPS (A-GPS) operation mode;

a GPS antenna for receiving GPS signals transmitted from at least one GPS satellite;

an RF (Radio Frequency) antenna for receiving an RF signal;

a C-GPS receiver for receiving a first set of GPS signals through the GPS antenna, extracting first navigation data from the first set of GPS signals and generating a C-GPS geolocation information by using the first navigation data, wherein the C-GPS geolocation information includes the latitude and the longitude of measurement location and number of GPS satellites transmitting the first set of GPS signals;

an A-GPS receiver for receiving a second set of GPS signals by using an assistance data received from the position determination entity, extracting second navigation data from the second set of GPS signals and generating an A-GPS data by using the second navigation data and the RF signal, wherein the A-GPS data includes number of the GPS satellites transmitting the second set of GPS signals and network ID and base station ID of the RF signal;

an embedded board having a CPU for setting the test apparatus to the C-GPS operation mode or the A-GPS operation mode according to a mode key received from the key input part, controlling the C-GPS receiver to generate the C-GPS geolocation information in the C-GPS operation mode and controlling the A-GPS receiver to generate the A-GPS data in the A-GPS operation mode;

a memory for storing the C-GPS geolocation information and the A-GPS data under the control of the CPU; and a wireless modem for modulating the C-GPS geolocation information and the A-GPS data, generating and transmitting a MAR optimizing data signal for use in optimizing the MAR, wherein the MAR optimizing data signal comprises the C-GPS geolocation information obtained in the C-GPS operation mode and the A-GPS data obtained in the A-GPS operation mode.

13. The test apparatus according to claim 12, wherein the memory is a nonvolatile memory.

14. The test apparatus according to claim 13, wherein the memory includes a flash memory card.

15. The test apparatus according to claim 14, wherein the flash memory card is at least one of a PCMCIA (Personal Computer Memory Card International Association) card, a compact flash card, a smart media card, a multimedia card and a secure digital card.

16. The test apparatus according to claim 12, wherein the embedded board includes:

a UART (Universal Asynchronous Receiver/Transmitter) chip for receiving/transmitting data from/to an internal communication device of the test apparatus;

a RAM for temporarily storing the C-GPS geolocation information and the A-GPS data; and a communication interface for receiving/transmitting data from/to a communication device through a USB port or a serial port.

17. The test apparatus according to claim 12 or claim 16, wherein the CPU stores the C-GPS geolocation information and the A-GPS data in the memory if the test apparatus fails to transmit in real-time the C-GPS geolocation information and the A-GPS data which are temporarily stored in the RAM.

18. The test apparatus according to claim 12, wherein the A-GPS data includes identification codes of at least one GPS satellite transmitting the second set of GPS signals, measurement time and strength of the second set of GPS signals and pseudorange.

19. A method for controlling a test apparatus with a view to optimizing a location-based service (LBS) by updating a maximum antenna range (MAR) set for a base station, the method comprising the steps of:
  (a) setting the test apparatus to an assisted-GPS (A-GPS) operation mode at each measurement location and transmitting an identification code of a wireless base station which covers or is adjacent to the measurement location to a position determination entity, wherein the identification code is received by the test apparatus from the wireless base station;
  (b) searching for and receiving a first set of GPS signals by receiving and analyzing an assistance data from the position determination entity;
  (c) generating and storing an A-GPS data, and switching the test apparatus into a conventional-GPS (C-GPS) operation mode, wherein the A-GPS data includes number of GPS satellites transmitting the first set of GPS signals and network ID and base station ID obtained through an RF signal of a mobile communication network;
  (d) searching for and receiving a second set of GPS signals;
  (e) generating a C-GPS geolocation information and, wherein the C-GPS geolocation information includes the latitude and the longitude of the measurement location and number of GPS satellites transmitting the second set of GPS signals;
  (f) gathering the C-GPS geolocation information and the A-GPS data, and transmitting the C-GPS geolocation information and the A-GPS data as a MAR optimizing data for use in optimizing the MAR to the position determination entity through the mobile communication networks.

20. The method according to claim 19, wherein at step (a) or step (c), the A-GPS operation mode or the C-GPS operation mode is set by operating at least one mode setting key button included in the test apparatus.

21. The method according to claim 19, wherein at step (a) or step (c), the AGPS operation mode or the C-GPS operation mode is set by using a GPS measurement program installed in the test apparatus.

22. The method according to claim 19, wherein at step (b), the test apparatus searches for the first set of GPS signals by using at least one GPS satellite location coordinate information included in the assistance data.

23. The method according to claim 19, wherein at step (e), the test apparatus temporarily stores the C-GPS geolocation information and the A-GPS data in an embedded memory and retransmits after a prescribed time interval if the test apparatus fails to transmit in realtime the C-GPS geolocation information and the A-GPS data.

24. The method according to claim 23, wherein the C-GPS geolocation information and the A-GPS data stored in the memory are copied or stored in another storing device by using a cable connected to the test apparatus.

25. The method according to claim 19, wherein the test apparatus starts operation in the C-GPS operation mode and then is switched to the A-GPS operation mode.

* * * * *